Aug. 1, 1972          A. E. CARMELLINI ET AL          3,681,165
METHOD OF MAKING A THREE-DIMENSIONAL MULTILAYER PANEL
Filed July 15, 1970                                    2 Sheets-Sheet 1
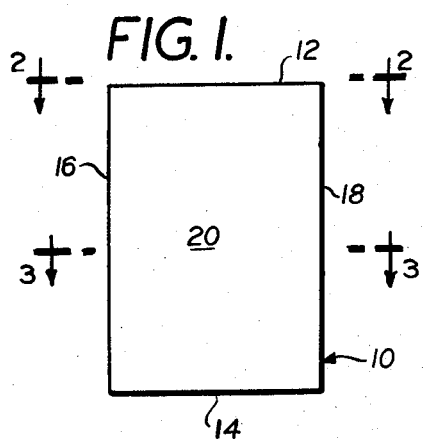
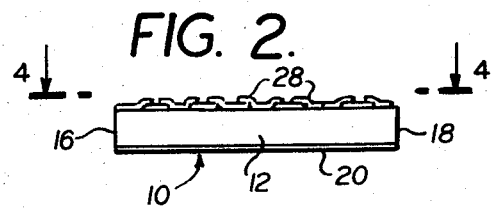
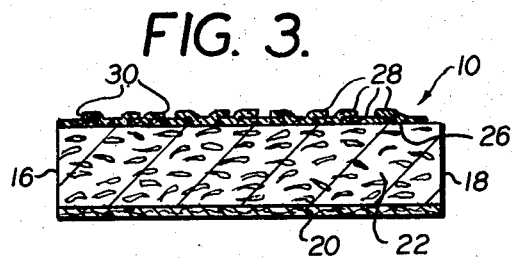
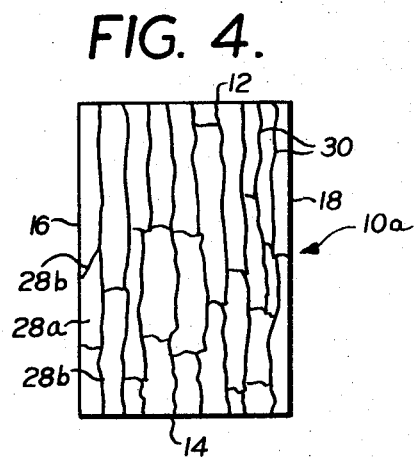
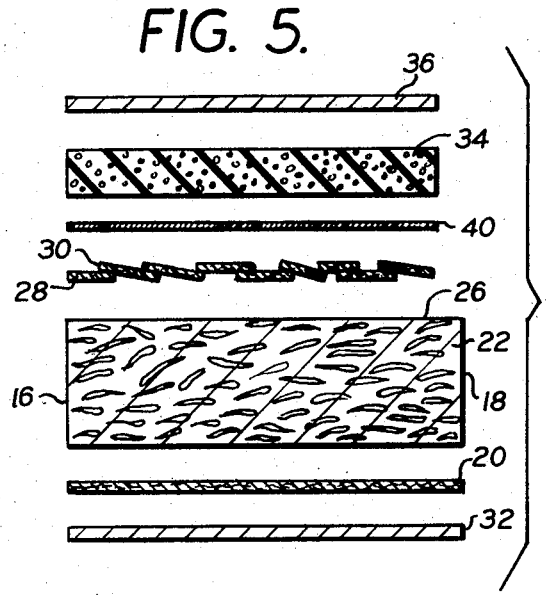
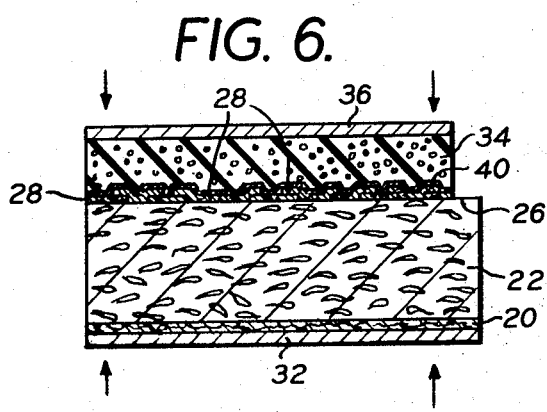
INVENTORS
ROBERT E. JAMES
ANDREW E. CARMELLINI
BY *James M. Heilman*
ATTORNEY.

INVENTORS
ROBERT E. JAMES
ANDREW E. CARMELLINI
BY James M. Heitman
ATTORNEY.

United States Patent Office 3,681,165
Patented Aug. 1, 1972

3,681,165
METHOD OF MAKING A THREE-DIMENSIONAL MULTILAYER PANEL
Andrew E. Carmellini, Brookfield, and Robert E. James, Danbury, Conn., assignors to U.S. Plywood-Champion Papers Inc., New York, N.Y.
Filed July 15, 1970, Ser. No. 54,881
Int. Cl. B32b 13/10
U.S. Cl. 156—297
7 Claims

ABSTRACT OF THE DISCLOSURE

A method of making a three-dimensional multilayer panel for use as doors, walls, and partitions, etc. It can feature use of waste veneer as well as good veneer for its face material to make a strong, lightweight panel with an attractive textured decorative surface.

The core is formed of agglomerated relatively large size wood particles, with a rear face or backing veneer of low grade sheets. On the front of the core, there are a number of elongated veneer strips laid on the core to overlay each other marginally and randomy but parallel one to the other so there is no planar surface. This is a preferred design, non parallel arrangements of veneer strips as well as small chips are possible. When these elements are bonded to each other and the core, a bold actual three dimensional relief panel is created.

---

The invention relates to improvements in composition boards and a new technique in the making thereof. Specificially, the invention relates to the method of making a three dimensional, multilayer panel for use as doors, walls, and partitions, etc. It can feature use of waste materials to make a strong, lightweight panel with an attractive textured decorative surface.

The core is formed of agglomerated relatively large size wood particles, with a rear face or backing veneer of low grade sheets. On the front of the core, there are a number of elongated veneer strips laid on the core to overlay each other marginally and randomly, but parallel one to the other so there is no planar surface. When these elements are bonded to each other and the core, a bold actual three dimensional relief panel is created.

An object of the invention is to provide a novel and improved board construction having a plurality of discrete layer portions forming an integrated whole.

Another object of the invention is to provide a novel and improved board construction in which there is a front face lamination layer bonded to at least one core layer portion, with a rear lamination layer on the rearward surface of said core layer portion in order to make a balanced panel.

A further object of the invention is to provide a novel and improved multilayer board construction in which there is a main core layer portion formed of fibrous core material, chips and the like of relatively large dimensions which have been agglomerated together for inter-chips fastening or bonding to form the main core of the board, a rear backing layer of low grade (such as American Plywood Assn's Grade D) sheet material secured to the rear surface of the core; there being a front facing layer portion of said board, which is formed of randomly laid-up pieces of sheet material of random non-uniform widths and lengths laid upon said front core surface in randomly overlapping array and secured to said core to provide a texturing of the resulting front outer surface of said board in bold actual three-dimensional relief.

Still another object of the invention is to provide a method of making a multilayer board of the type described, which substantially utilizes low cost material such as scrap veneer which might otherwise be discarded, and yet produces a sturdy multilayer board with an attractive textured surface.

Still a further object of the invention is to provide a novel and improved plywood board construction in which there is a front face layer portion of quasi-sheet forms in that it is formed during processing randomly laid strips of veneer of varying widths and lengths, with a slight degree of mutual overlapping at their edges, so that there is not a planar surface of the front face layer portion, but rather an actual visual three dimensional surface. Said strips comprising front face layer being bonded to each other and to said core portion permanently retain this novel and unique sculpture texture thus eliminating the need of textured embossing plates in the press when the panel is formed and also eliminates post machining of the panel which has been the main techniques used for achieving 3-dimensional textured surfaces in panels.

Another object of the invention is to provide a novel and improved plywood multilayer board of the type described which is made of low cost or scrap materials, and can be made by mass production methods and by use of relatively unskilled labor. Even the face veneers, which are of small size, would normally be scrap material and be burned or otherwise destroyed.

Other objects and advantages of the invention will become apparent from the following description of a preferred form of the invention, as illustrated in the accompanying drawings.

In the drawings:

FIG. 1 is a rear face view of an assembled panel or board according to the invention.

FIG. 2 is top edge view of the panel of FIG. 1.

FIG. 3 is a transverse sectional elevation taken substantially on plane 3—3 of FIG. 1, and on a large scale.

FIG. 4 is a front face view of a modified assembled panel but using veneers having ragged edges.

FIG. 5 is an exploded view of the panel of FIG. 3 on an enlarged scale showing the layers thereof and auxiliary elements required for manufacture of said panel.

FIG. 6 is a fragmentary sectional elevation similar to FIG. 5, but showing the rubber or other highly elastic blanket of caul in engagement with the irregular layer of overlapping strips and the core. Said elastic blanket or caul allows even pressures to be exerted on all areas of each veneer strip which is essential for bonding said strips to the core material.

Figure 7A:
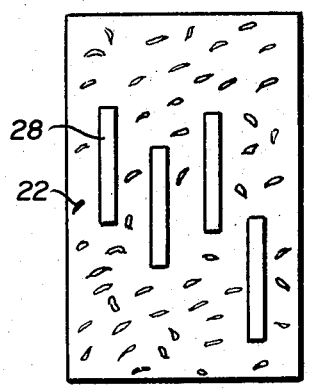
Figure 7B:
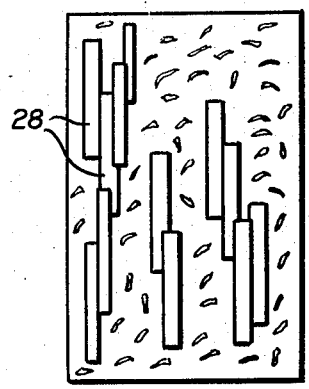
Figure 7C:
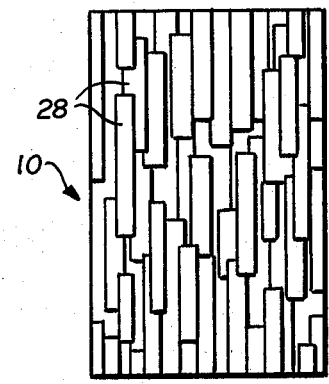

FIGS. 7A, 7B, and 7C show steps in the method of laying up the veneers, and also the preferred type of veneers having regular smooth edges rather than ragged edges.

In the production of wood products, especially on a large mass production scale, a considerable amount of wood residue is generated. It can be classified into the following categories: sawdust, chips, shavings, waste veneer, veneer cores, plywood panel trim scrap, bark and other coarse residues. Large volumes of such wood residues are not utilized for decorative panel products and are hence destroyed every year.

The present invention is particularly directed toward solving this problem by providing means for making good products from such residues. For example multilayer panels are described herein which not only have inherent qualities of lightness in weight, good strength for use as panels, doors etc., but also are so constructed as to have an actual, not just simulated outer three-dimensional face contour which is variable according to the desire of the prospective user or decorator.

According to the invention further, such panels are made of a low cost core of fibers or chips not too small in size, a backing layer of low cost veneer and a front face layer of elongated pieces of scrap veneer of random lengths and widths overlapping and overlaying slightly at their edges so as to avoid a plane surface, all being bonded or cemented together and presenting a novel actual three-dimentional or "College" (trademark U.S. Plywood-Champion Papers Inc.) effect to sight and touch.

In order to understand clearly the nature of the invention and the best means for carrying it out, reference may be had to the drawings, in which like numberals denote similar parts throughout the several views.

As seen in FIG. 1, there is a panel 10, shown generally in rectangular or oblong contour or otherwise, with top and bottom edges 12 and 14, and left and right edges 16 and 18. The back surface 20 of the panel 10 may be of a relatively inexpensive low grade veneer layer, sufficient for the purpose of creating a balanced panel secured to the fibrous core layer or panel body 22 by suitable adhesives or otherwise to form a flat or planar back surface.

The core portion 22 may be formed of relatively large sized fibrous pieces or particles of wood, such as result from production of wood products. For example only, such a core may be formed for the coarse core material (not the face material) according to Fahrni Pats, 2,642,371 and 2,686,143 Sears et al. 3,441,959, and Kamrath et al. Canadian 785,457. Various flameproofing agents may be added to the core particles and to the face and back veneers, such as the ammonium salts, as set forth in Craig 3,383,274, all of which patents are incorporated herein in their entirety. All of the above patents are owned by or are exclusively licensed to the assignee of this application.

It is important that the agglomerations of such large size particles in the core is such as not to compress them so much as to reduce resiliency. A suitable binder is used to hold the core in the desired shape and to give it the desired strength. Urea formaldehyde, or phenol formaldehyde are suitable binders as discussed in the above patents.

Attention may now be directed to the front surface 26 of the core 22, and for this structural purpose a number of elongated sheet strips 28 of scrap or waste veneer from the plywood manufacturing process are placed on top of the surface 26 of the core in random fashion, with their edges not forming a smooth planar surface but in edge overlapping random arrangement. This may be called a "College" (trademark) arrangement for the overlapped edges 30 project out of the plane and hence produce not only a visual effect but also an actual tactile or feelable effect. This is a bold three-dimensional effect, permitting the panel when finished to form a sculptured effect with a syncopated pattern or variegated waste wood strips of unusual shading and texture.

Referring to the drawings and particularly FIG. 7C, the assembly of the panel requires the strips 28 having smooth edges to be placed over the core 22 so as to cover it completely so that no openings appear between strips. Hence, there is always at least one thickness of strips 28 overlying the core. FIG. 7A shows the initial step in laying up the panel while FIG. 7B shows a more advanced step. FIG. 7C shows the final step. FIG. 4 illustrates a modified panel 10A in which the veneer strips 28A have irregular edges 28B and 28C.

The panel is now ready for processing a press. For this purpose as seen in FIG. 5, a lower caul plate 32 of sheet iron or aluminum or other suitable material underlies and supports the above stacked elements shown for convenience only in exploded form. The core 22 overlays back veneer sheet 20, and the variously length and width strips 28 are distributed on the core.

The core may be of any thickness. However, it is preferred that it be just short of ⅜ or ¾" when pressed so that the completed panel or board may be sold as ⅜" or ¾" products.

A release sheet 40 of wax or other paper is placed over the veneer strip.

A compressible blanket or caul 34 overlays the arrayed strips 28. This compressible layer or caul of sponge rubber, plastic or air filled bag is very important in producing the final three dimensional effect in the panel. If a sponge rubber blanket is used, it should be between ⅛" and ¾", preferably about ¼" thick, with a preferable durometer of 60 so that the pressure applied will bend the strips against the core but will flow around the individual veneer facing strips without flattening them into a plane surface.

A top caul 36 of sheet iron or aluminum overlies the rubber intermediate caul.

The closely stacked elements of FIG. 5, including the adhesively coated veneer strips, are moved to the press and subjected to 225 p.s.i. to 400 p.s.i., preferably about 350 p.s.i., at temperatures 320° F. to 375° F., preferably about 350° F. for 5 to 16 minutes, preferably about 10 minutes.

In FIG. 6 is shown schematically how the compressible rubber caul 34 presses the adhesively bonded strips into available interspaces to give a non-planar effect. The finished panel has a resulting surface of bold three-dimensional relief which is startling and attractive.

Although a preferred embodiment of the invention has been described in specific terms, it is understood that this is by way of example and not of limitation, and that various changes may be made without departing from the spirit and scope of the claims.

The embodiments of the invention in which an exclusive property or privilege is claimed are defined as follows:

1. A method of making a panel having a visual bold relief, three dimensional face surface which comprises forming a main solid core portion, positioning a back sheet veneer on said solid core portion, placing a plurality of strips of veneer of varying widths and lengths upon the upper surface of said core portion so as to marginally overlie their neighboring edges to thereby secure a non-planar top surface, applying a bonding agent for bonding said strips, core portion and back sheet one to the other, and subjecting the strips, core portion and back sheet to pressure using a compressible caul upon said strips at a temperature and pressure adapted to maintain said non-planar top surface and secure said bold relief three dimensional face surface.

2. Method as defined by claim 1 wherein said compressible caul comprises a gas filled envelope, and wherein a waxed release sheet is positioned intermediate said compressible caul and said strips.

3. Method as defined by claim 1 wherein said core consists of a thickness of about ⅜" to ¾".

4. The method of claim 1, wherein said compressible caul is made of easily compressible sponge rubber.

5. The method of claim 4, wherein the pressure is between 225–400 p.s.i. temperature between 320–375° F., and the time for bonding the coarse wood particles and the facings together is between 5–16 minutes, and the thickness of the compressible sponge rubber caul is in the range of 1/8" to 3/4" whereby the applied pressure will cause the sponge rubber to flow over the various strips without forcing them into a plane surface.

6. The method of claim 5 wherein the pressure is about 350 p.s.i., the temperature is about 350° F. for about 10 minutes, and the sponge rubber layer is about 1/4" thick and the adhesives used for bonding said elements is a 60% solids urea resin material.

7. Method as defined by claim 5 wherein said sponge rubber is formed with a durometer of about 60.

References Cited

UNITED STATES PATENTS

| | | | |
|---|---|---|---|
| 2,120,642 | 6/1938 | Elmendorf | 156—299 X |
| 2,217,773 | 10/1940 | Selva | 156—300 X |

FOREIGN PATENTS

| | | | |
|---|---|---|---|
| 555,991 | 4/1958 | Canada | 156—299 |

BENJAMIN A. BORCHELT, Primary Examiner

G. E. MONTONE, Assistant Examiner

U.S. Cl. X.R.

156—59, 196, 299; 161—60